(12) United States Patent
Tanno et al.

(10) Patent No.: US 11,243,549 B2
(45) Date of Patent: Feb. 8, 2022

(54) VALVE AND FLUID SUPPLY LINE

(71) Applicant: Fujikin Incorporated, Osaka (JP)

(72) Inventors: Ryutaro Tanno, Osaka (JP); Kenji Aikawa, Osaka (JP); Akihiro Harada, Osaka (JP); Yuya Suzuki, Osaka (JP); Takahiro Matsuda, Osaka (JP); Katsunori Komehana, Osaka (JP); Masahiko Ochiishi, Osaka (JP); Tsutomu Shinohara, Osaka (JP)

(73) Assignee: Fujikin Inc., Osaka (JP)

( * ) Notice: Subject to any disclaimer, the term of this patent is extended or adjusted under 35 U.S.C. 154(b) by 46 days.

(21) Appl. No.: 16/648,327

(22) PCT Filed: Aug. 28, 2018

(86) PCT No.: PCT/JP2018/031754
§ 371 (c)(1),
(2) Date: Mar. 18, 2020

(87) PCT Pub. No.: WO2019/065048
PCT Pub. Date: Apr. 4, 2019

(65) Prior Publication Data
US 2020/0225686 A1 Jul. 16, 2020

(30) Foreign Application Priority Data
Sep. 30, 2017 (JP) .............................. JP2017-192269

(51) Int. Cl.
*G05D 7/06* (2006.01)
*F16K 27/00* (2006.01)
(Continued)

(52) U.S. Cl.
CPC ......... *G05D 7/0623* (2013.01); *F16K 27/003* (2013.01); *G05D 7/0647* (2013.01);
(Continued)

(58) Field of Classification Search
CPC ............... G05D 7/0623; G05D 7/0647; G05D 16/2046; G05D 16/2053; Y10T 137/7768;
(Continued)

(56) References Cited

U.S. PATENT DOCUMENTS 2,877,791 A * 3/1959 Rich .......................... F16K 7/17
137/487
4,702,287 A * 10/1987 Higbie .................... B60S 5/046
141/4
(Continued)

FOREIGN PATENT DOCUMENTS

CN 1816733 A 8/2006
CN 101208641 6/2008
(Continued)

*Primary Examiner* — William M McCalister
(74) *Attorney, Agent, or Firm* — Chris Mizumoto (57) ABSTRACT

The present invention is intended to improve the accuracy of control of a material gas by providing a valve with simplified wiring and a fluid supply line equipped with the valve.
A valve V includes a valve body 3 and a driving pressure control device 4 coupled to the valve body 3. The driving pressure control device 4 includes: a driving pressure introduction path 431 connected to a driving pressure supply source G outside a line; an automatic valve 411 that opens and closes the driving pressure introduction path 431; a driving pressure introduction path 433 that couples to a driving pressure introduction port 3*a* of the valve body 3; an automatic valve 412 that opens and closes the driving pressure introduction path 433 in conjunction with the automatic valve 411 and opens and closes an exhaust passage 44 that discharges a driving pressure from the driving pressure introduction path 433; and a driving pressure introduction path 432 that couples the driving pressure introduction path 431 and the driving pressure introduction path 433 via the automatic valve 411 and the automatic valve 412.

7 Claims, 11 Drawing Sheets

(51) Int. Cl.
*F16K 7/17* (2006.01)
*F16K 31/122* (2006.01)
*F16K 31/12* (2006.01)

(52) U.S. Cl.
CPC ............... *F16K 7/17* (2013.01); *F16K 27/00* (2013.01); *F16K 31/12* (2013.01); *F16K 31/1225* (2013.01)

(58) Field of Classification Search
CPC ...... F16K 7/17; F16K 31/1225; F16K 27/003; F16K 27/00; F16K 31/12
USPC ...................................... 137/489.5
See application file for complete search history.

(56) References Cited

U.S. PATENT DOCUMENTS

| | | | |
|---|---|---|---|
| 4,813,339 A * | 3/1989 | Uno ................... | F15B 11/0426 318/599 |
| 4,962,690 A * | 10/1990 | Moller ................ | B60T 8/361 137/627.5 |
| 5,654,885 A * | 8/1997 | Mayhew .............. | F15B 9/09 700/282 |
| 7,367,241 B2 | 5/2008 | Ohmi et al. | |
| 7,770,612 B1 * | 8/2010 | Brown ................. | B60P 7/065 141/193 |
| 8,418,714 B2 | 4/2013 | Ohmi et al. | |
| 9,010,369 B2 | 4/2015 | Ohmi et al. | |
| 2002/0092564 A1 | 7/2002 | Ollivier | |
| 2003/0131792 A1 * | 7/2003 | Park .................. | C23C 16/45557 118/712 |
| 2005/0277010 A1 | 12/2005 | Lamont et al. | |
| 2008/0149186 A1 * | 6/2008 | Martin ................ | G05D 7/0647 137/85 |
| 2009/0126798 A1 * | 5/2009 | Mather ............... | E21B 41/0021 137/12 |
| 2012/0204974 A1 * | 8/2012 | Sakasegawa .......... | G05D 7/005 137/486 |
| 2018/0246532 A1 | 8/2018 | Nakamura et al. | |

FOREIGN PATENT DOCUMENTS

| | | |
|---|---|---|
| JP | H1-126481 | 5/1989 |
| JP | H11-82763 | 3/1999 |
| JP | 2003-529218 | 9/2003 |
| JP | 2004-316837 | 11/2004 |
| JP | 2006-319190 | 11/2006 |
| JP | 2007-4644 A | 1/2007 |
| JP | 2007-515726 | 6/2007 |
| JP | 4204400 B2 | 10/2008 |
| JP | 2008-286812 | 11/2008 |
| JP | 4856905 B2 | 11/2011 |
| JP | 2012-33188 | 2/2012 |
| JP | 2016-223533 | 12/2016 |
| WO | WO2017033757 | 3/2017 |

* cited by examiner

VALVE AND FLUID SUPPLY LINE

CROSS-REFERENCE

This application is a national phase of an international application, PCT/JP2018/031754 filed on Aug. 28, 2018, which claims the benefit of Japanese Application No. 2017-192269 filed on Sep. 30, 2017.

TECHNICAL FIELD

The present invention relates to a technique for simplifying wiring of a valve and a fluid supply line and improving the accuracy of control of a material gas.

BACKGROUND ART

Fluid control devices such as an automatic valve are used in a fluid supply line that supplies a process fluid used in a semiconductor manufacturing process.

In recent years, semiconductor manufacturing processes such as atomic layer deposition (ALD) have become more sophisticated and complicated, so that the number of fluid control devices installed in fluid supply lines has been increasing. In addition, with the advancement of fluid control devices, the wiring around flow control devices such as electric wiring and air tubes that supply a driving pressure has become more complicated.

In this regard, Patent Literature 1 proposes a valve that includes a body in which a first flow passage and a second flow passage are formed; and a valve element that allows or disallows communication between the first flow passage and the second flow passage. The body has: a base part that has a first surface located on the valve element side and a second surface located on the side opposite to the first surface; a first coupling part that has a third surface forming a step from the second surface; and a second coupling part that has a fourth surface forming a step from the first surface. The first flow passage has a first-first flow passage and a first-second flow passage. The first-first flow passage has a first-first port opened to the third surface. The first-second flow passage has a first-third port communicating with a first-second port of the first-first flow passage and opened to the valve element. The first-second flow passage has a first-fourth port opened to the fourth surface. The first flow passage and the second flow passage are capable of communication with each other via the first-third port. The first coupling part is coupled to a part of a body of another valve corresponding to the second coupling part. The first-first flow passage communicates with a flow passage of a body of another valve corresponding to the first-second flow passage different from the first-first flow passage.

CITATION LIST

Patent Literature

Patent Literature 1: JP 2016-223533 A

SUMMARY OF INVENTION

Technical Problem

When the electrical wiring and air tubes become complicated, there is a risk of causing breakage and twisting, resulting in malfunction, and the connection destination of the wiring is confused, which is inconvenient for maintenance. In addition, with the miniaturization of semiconductor manufacturing processes, higher accuracy has been recently required for control of a material gas in the fluid supply lines. Thus, there has been demand for simplification of the wiring to ensure electromagnetic performance and achieve noise reduction and response delay prevention.

Furthermore, in order to improve the accuracy of a fluid supply line on which a plurality of valves is mounted, it is necessary to suppress variations in operations of the valves.

Therefore, an object of the present invention is to improve the accuracy of control of a material gas by providing a valve with simplified wiring and a fluid supply line equipped with the valve.

Solution to Problem

In order to achieve the above-mentioned object, a valve according to an aspect of the present invention is a valve that includes: a valve body; and a driving pressure control device that is coupled to the valve body. The driving pressure control device includes: a first driving pressure introduction path connected to a driving pressure supply source outside a line; a first automatic valve that opens and closes the first driving pressure introduction path; a second driving pressure introduction path that couples to a driving pressure introduction port of the valve body; a second automatic valve that opens and closes the second driving pressure introduction path in conjunction with the first automatic valve and opens and closes an exhaust passage that discharges a driving pressure from the second driving pressure introduction path; and a third driving pressure introduction path that couples the first driving pressure introduction path and the second driving pressure introduction path via the first automatic valve and the second automatic valve.

A fluid supply line according to another aspect of the present invention is a fluid supply line that includes a flow rate control device and the valve. The fluid supply line has: a first connection means that connects a mechanism outside the fluid supply line and the flow rate control device; and a second connection means that branches from the first connection means in the fluid supply line and is connected to the valve.

The first connection means and the second connection means may be driving pressure supply paths for supplying a driving pressure used for driving the valve from the mechanism outside the fluid supply line.

The first connection means and the second connection means may be electric wiring that enable communication between the mechanism outside the fluid supply line and the flow rate control device and the valve.

A plurality of the fluid supply lines may be arranged in parallel to form a gas unit, and the first connection means may branch in the vicinity of the gas unit for each of the plurality of fluid supply lines and be connected to each of flow rate control devices on the plurality of fluid supply lines.

The flow rate control device is a flow rate range variable-type flow rate control device. The flow rate range variable-type flow rate control device may be provided with at least a fluid passage for small flow rate and a fluid passage for large flow rate as fluid passages to a flow rate detection unit of a flow rate control device. The flow rate range variable-type flow rate control device may flow a fluid in a small flow rate range to the flow rate detection unit through the fluid passage for small flow rate and switch a detection level of the flow rate control unit to a detection level suited for detection of the small flow rate range according to presence or absence of supply of a driving pressure, and may flow a fluid in a large flow rate range to the flow rate detection unit through the fluid passage for large flow rate and switch the detection level of the flow rate control unit to a detection level suited to detection of the flow rate in the large flow rate range according to presence or absence of supply of the driving pressure, thereby to perform a flow rate control while switching between the fluid in the large flow rate range and the fluid in the small flow rate range.

Further, the driving pressure supplied to the flow rate range variable-type flow rate control device may be supplied to another fluid control device through the flow rate range variable-type flow rate control device.

The flow rate control device is a differential pressure-type flow rate control device. The differential pressure-type flow rate control device may include: a control valve unit that includes a valve drive unit; an orifice that is provided downstream of the control valve; a detector of a fluid pressure upstream of the orifice; a detector of a fluid pressure downstream of the orifice; a detector of a fluid temperature upstream of the orifice; a control arithmetic circuit that includes a flow rate comparison circuit configured to calculate a fluid flow rate using detected pressures and a detected temperature from the detectors and calculate a difference between the calculated flow rates and a preset flow rate.

Advantageous Effects of Invention

According to the present invention, the wiring connected to the valve can be simplified, and the wiring of the fluid supply line equipped with the valve can be simplified as well. As a result, the accuracy of control of the material gas in the fluid supply line can be improved.

BRIEF DESCRIPTION OF DRAWINGS

FIG. 4(*a*) is an overall view; and FIG. 4(*b*) is a partially enlarged view.

DESCRIPTION OF EMBODIMENTS

Hereinafter, a valve according to an embodiment of the present invention and a fluid supply line including the valve will be described.

Figure 1:
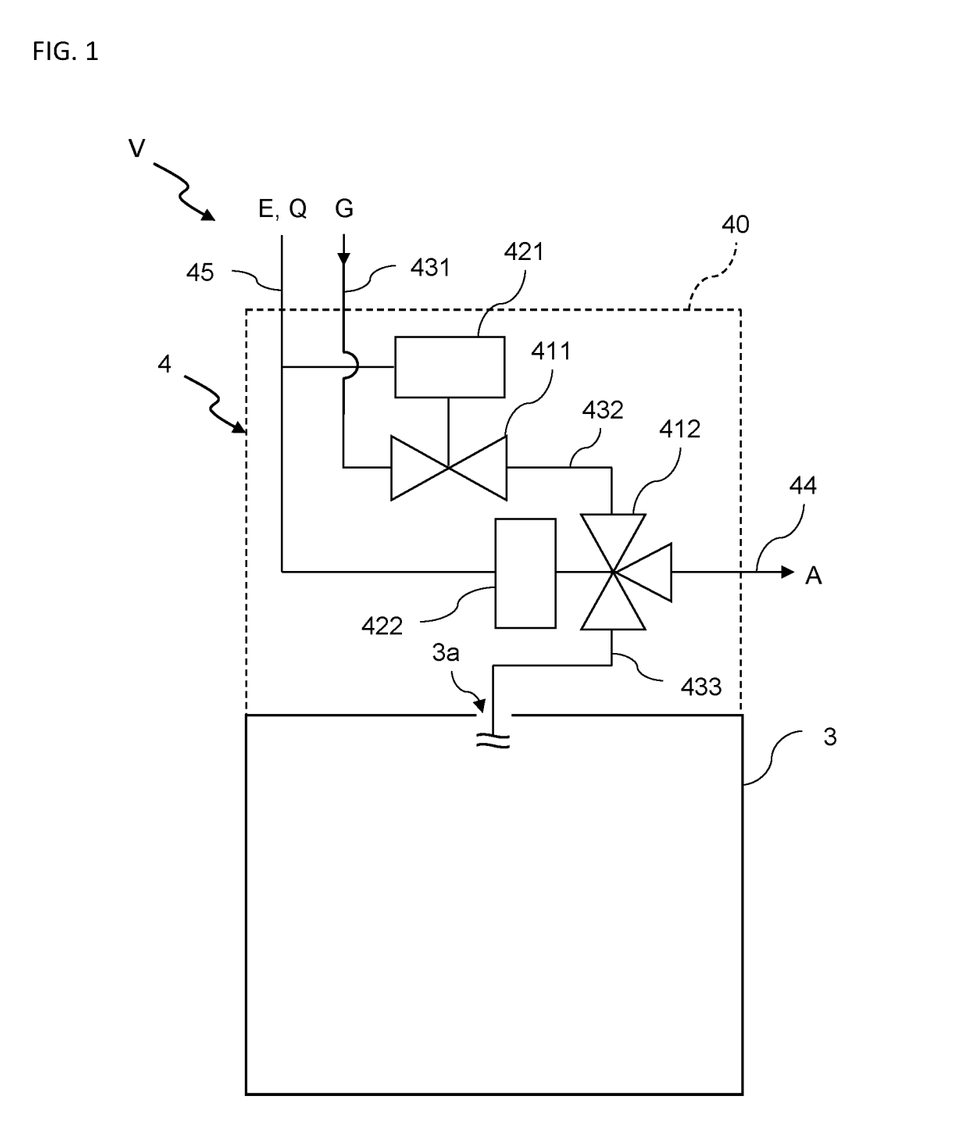
FIG. 1 is a schematic diagram showing the internal structure of a valve according to an embodiment of the present invention.

As shown in FIG. 1, the valve V according to the present embodiment includes a valve body 3 and a driving pressure control device 4 coupled to the valve body 3.

The valve body 3 is a valve used in a gas line of a fluid control device, such as a diaphragm valve, and includes at least a driving pressure introduction port 3*a* for introducing a driving pressure supplied from the outside to inside.

The driving pressure control device 4 is connected to the driving pressure introduction port 3*a* of the valve body 3, and supplies the driving pressure supplied from a driving pressure supply source G outside the line to the valve body 3.

The driving pressure control device 4 includes driving pressure introduction paths 431, 432, and 433 as introduction paths for introducing driving pressure from the driving pressure supply source G outside the line to the valve body 3. The driving pressure introduction path 431 is connected to the driving pressure supply source G outside the line. The driving pressure introduction path 432 couples the driving pressure introduction path 431 and the driving pressure introduction path 433 via an automatic valve 411 and an automatic valve 412. The driving pressure introduction path 433 is connected to the driving pressure introduction port 3*a* of the valve body 3.

The driving pressure control device 4 includes a normally closed (N.C.) automatic valve 411 that opens and closes the driving pressure introduction path 431 and a normally opened (N.O.) automatic valve 412 that opens and closes the driving pressure introduction path 433 in conjunction with the automatic valve 411 and opens and closes an exhaust passage 44 that discharges the driving pressure from the driving pressure introduction path 433 to the outside A of the device.

The automatic valves 411 and 412 are opened and closed by valve drive units 421 and 422, respectively. The valve drive units 421 and 422 receive an instruction signal for instructing an operation together with the supply of power from a power supply source E and an instruction signal transmission source Q via a wiring 45, and execute the operation based on the instruction signal.

Both the automatic valves 411 and 412 can be constituted by various valves such as a normal solenoid valve, an air-operated solenoid valve, or an electric valve.

In the driving pressure control device 4, the automatic valves 411 and 412, the valve drive units 421 and 422, the driving pressure introduction paths 431, 432, and 433, and others are covered with a hollow cap-shaped casing 40, and the casing 40 is put on the valve body 3 in such a manner as to be integrated with the valve body 3.

The valve body 3 and the casing 40 can be appropriately integrated by means such as screwing or bonding with an adhesive.

In the thus configured driving pressure control device 4, the driving pressure supplied from the driving pressure supply source G outside the line is always automatically supplied to the automatic valve 411 via the driving pressure introduction path 431 regardless of the open and close states of the automatic valves 411 and 412.

The opening and closing operations of the driving pressure control device 4 will be described. First, when the automatic valve 411 is opened by the valve drive unit 421, the driving pressure supplied to the automatic valve 411 is led to the automatic valve 412 through the driving pressure introduction path 432. The automatic valve 412 is interlocked with the automatic valve 411. The automatic valve 412 opens along with the opening of the automatic valve 411 to close the exhaust passage 44 so that the driving pressure is supplied to the valve body 3 through the driving pressure introduction path 433.

On the other hand, when the automatic valve 411 is closed by the valve drive unit 421, the driving pressure supplied from the driving pressure supply source G is blocked by the automatic valve 411. Further, when the automatic valve 412 interlocked with the automatic valve 411 is opened, the exhaust passage 44 is opened to discharge the driving pressure in the valve body 3.

According to the valve V according to the present embodiment, the driving pressure control device 4 and the valve body 3 are integrally coupled, which makes it possible to simplify the wiring connected to the valve V.

In addition, the driving pressure is always supplied up to the automatic valve 411 of the driving pressure control device 4 that is integrally connected to the valve body 3, which makes it possible to maintain the driving pressure in a state at a constant high level near the driving pressure introduction port 3a of the valve body 3. As a result, the valve body 3 is less susceptible to changes in the driving pressure when opening and closing, the opening and closing speed can be kept constant, and the accuracy of control of the material gas can be improved.

The valve V described above is structured such that the driving pressure control device 4 is coupled to the valve body 3. However, the present invention is not limited to this structure but there may be provided a space for incorporating the driving pressure control device 4 in the valve body 3 so that the driving pressure control device 4 can be contained in the space.

Next, the fluid supply line constituted by the valve V described above will be described.

Figure 2:
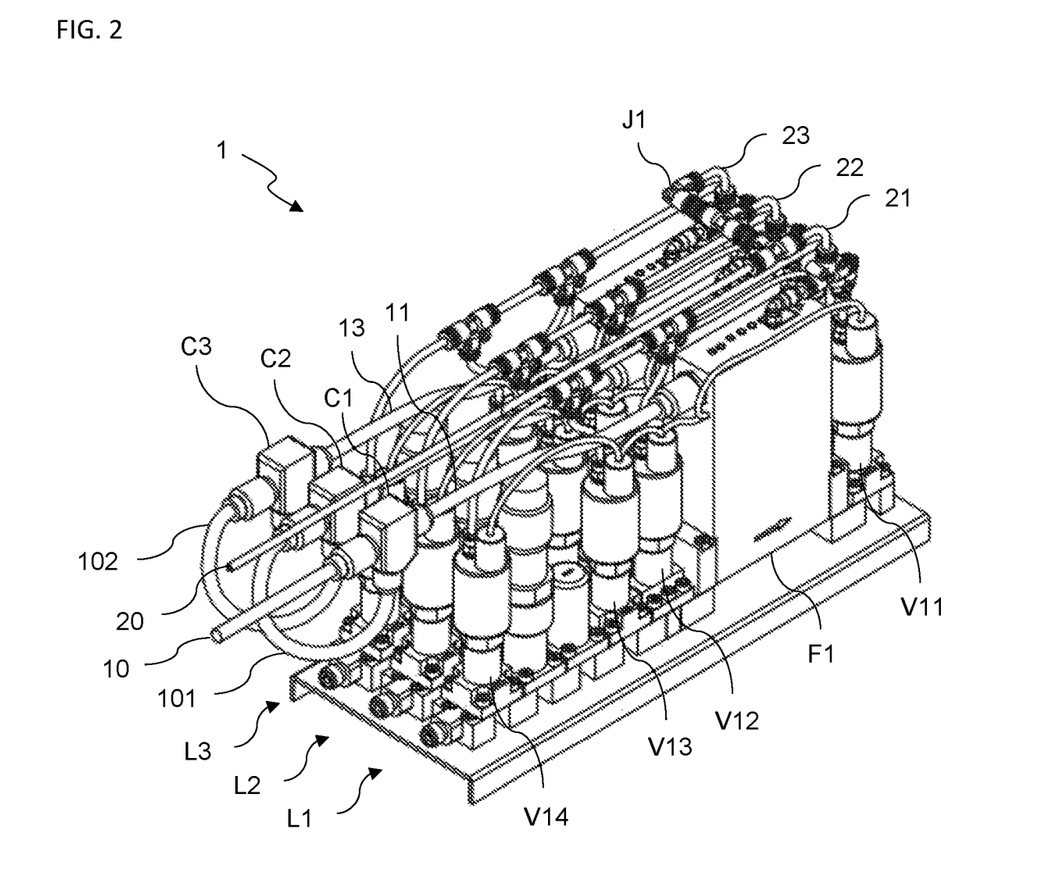
FIG. 2 is an external perspective view of a gas unit constituted by a fluid supply line according to an embodiment of the present invention.
Figure 3:
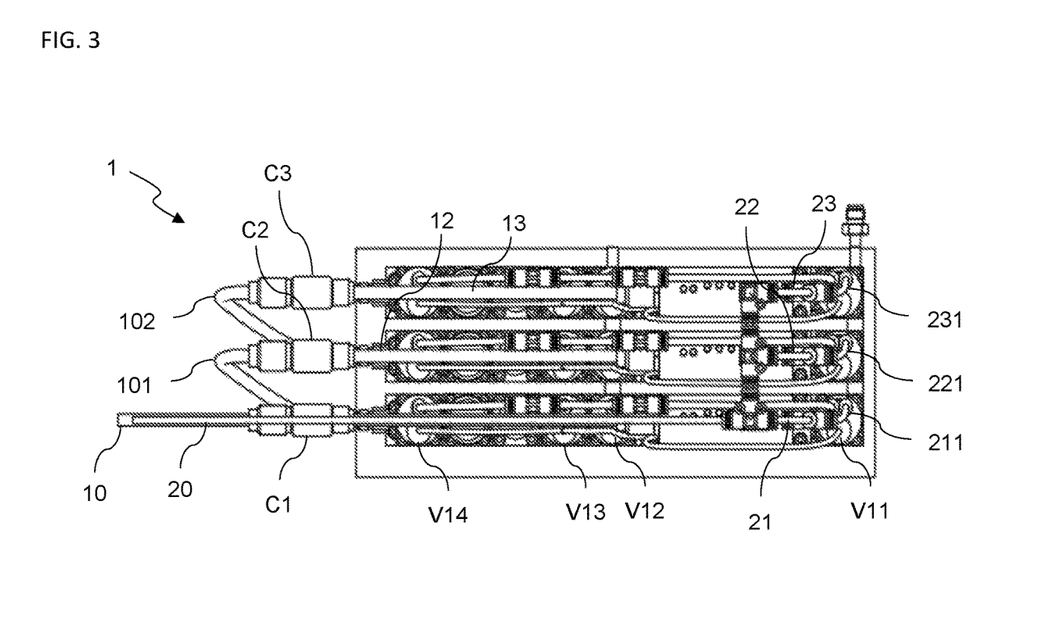
FIG. 3 is a plan view of the gas unit constituted by the fluid supply line according to the present embodiment.
Figure 4:
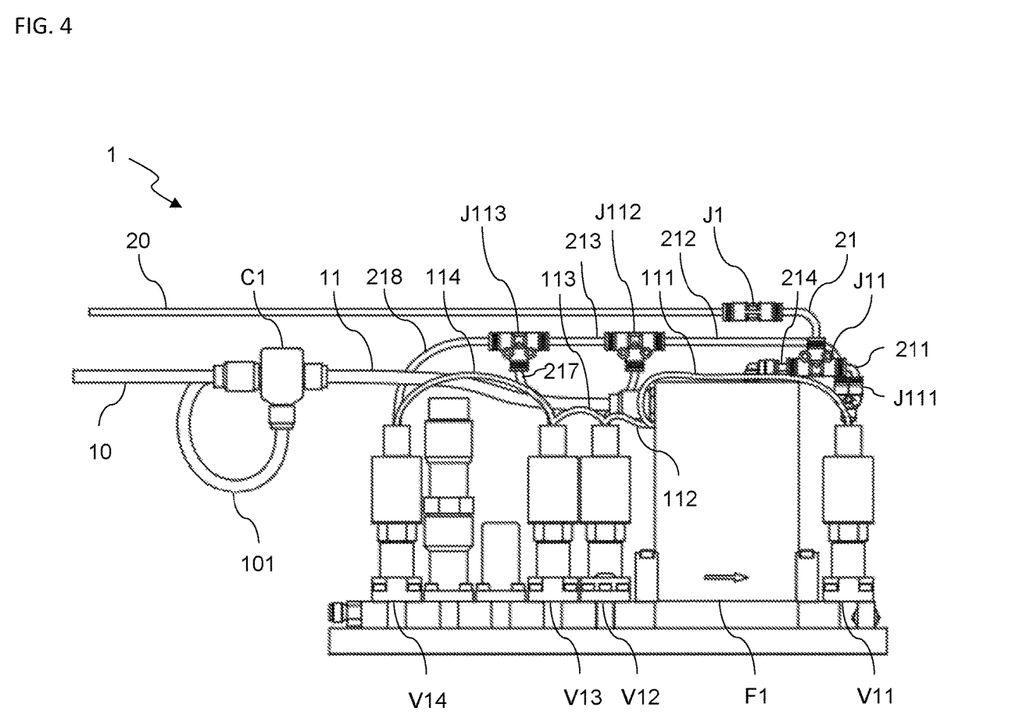
FIG. 4 is a side view of the gas unit constituted by the fluid supply line according to the present embodiment.

As shown in FIGS. 2 to 4, a gas unit 1 includes three fluid supply lines L1, L2, and L3 according to the present embodiment.

Each of the "fluid supply lines (L1, L2, and L3)" here is one of constituent units of the gas unit, and is formed from a route through which a process fluid flows and a group of fluid control devices disposed on the route. In addition, the fluid supply line is a minimum constituent unit that can control a process fluid and independently process an object to be processed. The gas unit is usually configured by arranging the plurality of fluid supply lines in parallel. In addition, the term "outside the line" appearing in the following description refers to parts or mechanisms that do not constitute the fluid supply lines. The mechanisms outside the line include a power supply decrease that supplies electric power necessary for driving the fluid supply lines, a driving pressure supply source that supplies a driving pressure, a device communicable with the fluid supply lines, and others.

Each of the fluid supply lines L1, L2, and L3 is formed by causing a plurality of fluid control devices to communicate with one another in a fluid-tight manner. The fluid control devices constituted by the valve V include valves (V11 to V14, V21 to V24, and V31 to V34) and flow rate control devices (F1 to F3). In the following description, the valves (V11 to V14, V21 to V24, and V31 to V34) may be collectively called valve V, and the flow rate control devices (F1 to F3) may be collectively called flow rate control device F.

The flow rate control device F is a device that controls the flow rate of the fluid in each of the fluid supply lines L1, L2, and L3.

The flow rate control device F can be constituted by, for example, a flow rate range variable-type flow rate control device. The flow rate range variable-type flow rate control device is a device that can automatically switch and select a flow rate control region by operating a switching valve.

The flow rate range variable-type flow rate control device has, for example, a fluid passage for small flow rate and a fluid passage for large flow rate as fluid passages to a flow rate detection unit of the flow rate control device. The flow rate range variable-type flow rate control device flows a fluid in a small flow rate range to the flow rate detection unit through the fluid passage for small flow rate and switches a detection level of the flow rate control unit to a detection level suited for detection of the small flow rate range, and flows a fluid in a large flow rate range to the flow rate detection unit through the fluid passage for large flow rate and switches the detection level of the flow rate control unit to a detection level suited for detection of the flow rate in the large flow rate range, thereby to perform a flow rate control while switching between the fluid in the large flow rate range and the fluid in the small flow rate range.

In the flow rate control device F configured as the flow rate range variable-type flow rate control device, the control for switching and selection of the flow rate control region can be executed according to whether a driving pressure is supplied to a drive unit of the flow rate control device F.

The driving pressure supplied to the flow rate control device F can be supplied to other fluid control devices such as the valve V connected to the flow rate control device F through the flow rate control device F once supplied.

In the flow rate range variable-type flow rate control device, a pressure-type flow rate control device is configured such that the flow rate of a fluid flowing through an orifice is calculated as $Qc=KP_1$ (K represents a proportionality constant) or as $Qc=KP_2{}^m(P_1-P_2)^n$ (K represents a proportionality constant, and m and n represent constants) using an orifice upstream pressure P1 and/or an orifice downstream pressure P2. In the pressure-type flow rate control device, fluid passages between a downstream side of a control valve and a fluid supply pipe line can be set to at least two or more parallel fluid passages, and orifices different in fluid flow rate characteristics can be interposed in the parallel fluid passages. In this case, the flow rate range variable-type flow rate control device flows the fluid in the small flow rate range to one orifice for the flow rate control of the fluid in the small flow rate range, and flows the fluid in the large flow rate range to at least the other orifice for the flow rate control of the fluid in the large flow rate range.

In addition, the flow rate ranges can be set in three stages. In this case, three types of orifices, that is, an orifice for large flow rate, an orifice for medium flow rate, and an orifice for small flow rate, are set such that a first switching valve, a second switching valve, and the large flow rate orifice are interposed in series in one fluid passage, the small flow rate orifice and the medium flow rate orifice are interposed in the other fluid passage, and a passage where both the switching valves communicates with each other and a passage where the small flow rate orifice and the medium flow rate orifice are allowed to communicate with each other.

According to the flow rate range variable-type flow rate control device, it is possible to maintain a high control accuracy while expanding the flow rate control range.

In another example, the flow rate control device F can be configured by a differential pressure control-type flow rate control device. The differential pressure control-type flow rate control device is a device that uses a flow rate calculation formula derived from Bernoulli's theorem as a basis and calculates a fluid flow rate by adding various corrections to the flow rate calculation formula.

The differential pressure-type flow rate control device includes a control valve unit having a valve drive unit, an orifice provided downstream of the control valve, a detector of a fluid pressure $P_1$ upstream of the orifice, and a detector of a fluid pressure $P_2$ downstream of the orifice, and a detector of a fluid temperature T upstream of the orifice. The differential pressure-type flow rate control device uses the detected pressures and the detected temperature from the detectors by a built-in control arithmetic circuit to calculate a fluid flow rate Q as $Q = C_1 \cdot P_1/\sqrt{T} \cdot ((P_2/P_1)m - (P_2/P_1)n)^{1/2}$ (where $C_1$ represents a proportional constant, and m and n represent constants), and calculate the difference between the calculated flow rate and a preset flow rate.

According to the differential pressure-type flow rate control device, it is possible to use the device in an in-line form without being restricted by the mounting posture and perform high-accuracy flow rate measurement or flow rate control in real time such that the control flow rate is hardly affected by fluctuations in pressure.

The flow rate control device F includes an operation information acquisition mechanism that acquires operation information of the flow rate control device F and an information processing module that is capable of aggregating operation information of the valves V forming the same line, monitoring the valves V, and controlling the valves V.

For example, the operation information acquisition mechanism can be constituted by various sensors built in the flow rate control device F, arithmetic devices that perform a flow rate control, information processing modules that processes information from the sensors and the arithmetic devices.

In particular, for the valves V constituting the same fluid supply lines L1, L2, and L3, the operation information of the valves V can be aggregated in the flow rate control device F by causing the valves V to supply a driving pressure from a mechanism outside the line via the flow rate control device F or making the valves V communicable. As a result, the operation information of the entire line is formed by combining the operation information of the valves V and the operation information of the flow rate control device F.

The valve V has the above-described configuration as an operation mechanism, and also has a pressure sensor, a temperature sensor, a limit switch, a magnetic sensor, or the like at a predetermined position as an operation information acquisition mechanism that acquires operation information of the valve V. Furthermore, the valve V contains an information processing module for processing data detected by the pressure sensor, temperature sensor, limit switch, magnetic sensor or the like.

The mounting position of the operation information acquisition mechanism is not limited, and the operation information acquisition mechanism may be mounted outside the valves V, such as on the driving pressure supply path or on the electric wiring in view of its function.

The pressure sensor includes, for example, a pressure-sensitive element that detects a pressure change in a predetermined space, a conversion element that converts a detected value of pressure detected by the pressure-sensitive element into an electrical signal, and the like, and detects changes in pressure in a sealed internal space.

The temperature sensor is, for example, a sensor that measures the temperature of a fluid, and is installed in the vicinity of the flow passage to measure the temperature of the place, so that the temperature of the installation place can be regarded as the temperature of the fluid flowing through the flow passage.

The limit switch is fixed near the piston, for example, and the switch is switched according to the vertical movement of the piston. This makes it possible to detect the number of times of opening and closing the valves V, the frequency of opening and closing, the opening and closing speed, and the like.

The magnetic sensor can measure not only the open and close states of the valves V but also the opening degree by sensing a change in the distance between the magnetic sensor and the magnet attached at a predetermined position.

Figure 5:
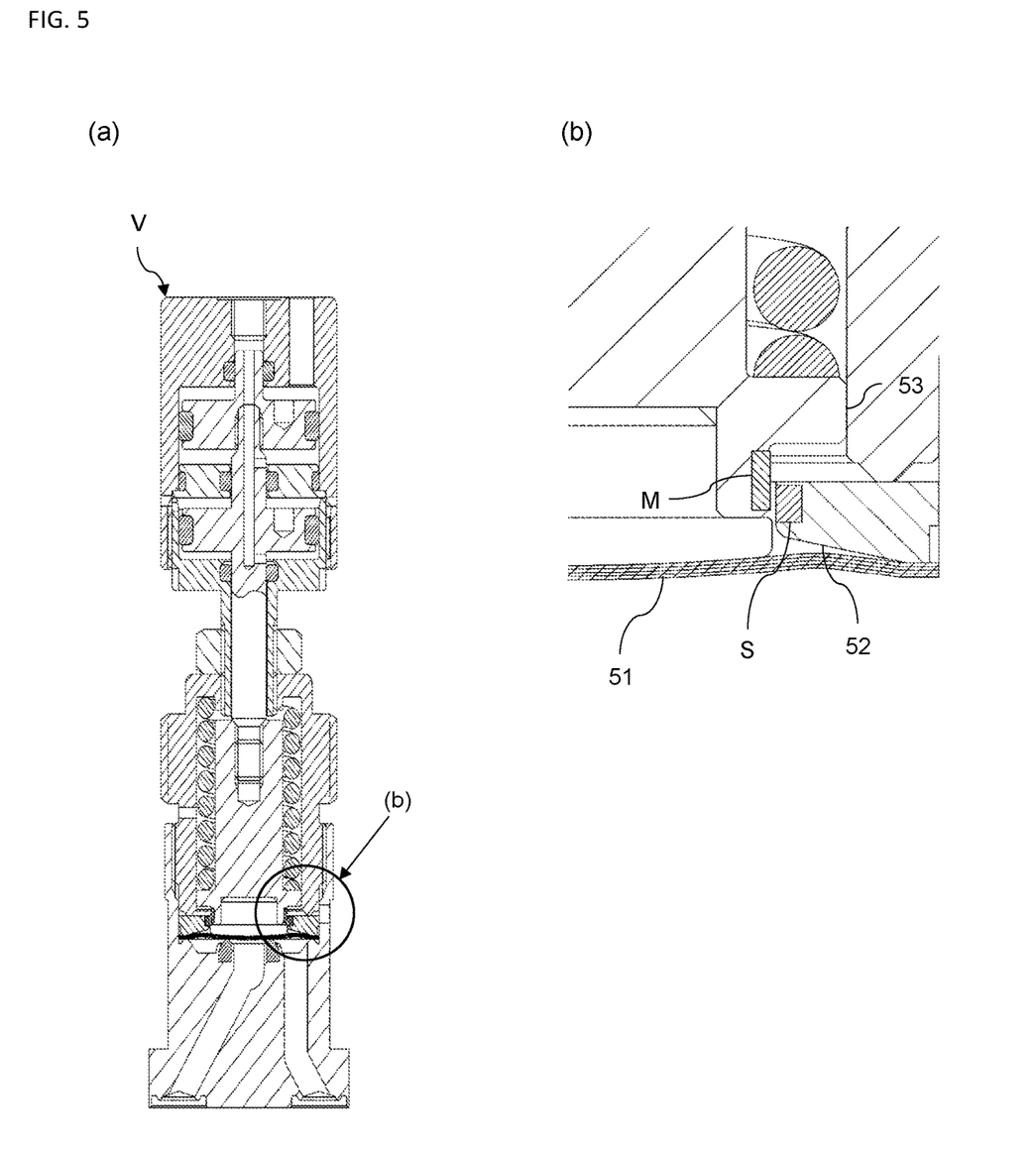
FIG. 5 is a cross-sectional view of an internal structure of a valve constituting the fluid supply line according to the present embodiment including a magnetic sensor.

More specifically, as shown in the example of FIG. 5, a magnetic sensor S is attached to an inner side of a pressing adapter 52 that presses a peripheral edge of a diaphragm 51 and is opposed to a stem 53. A magnet M is attached in the vicinity of the pressing adapter 52 of the stem 53 that slides according to the opening and closing operations of the valve V.

The magnetic sensor S has a planar coil, an oscillation circuit, and an integration circuit, and the oscillation frequency changes according to a change in the distance from the magnet M located at the opposing position. Converting this frequency by the integration circuit and obtaining the integrated value makes it possible to measure not only the open and close states of the valves V but also the opening degree at the time of opening the valve V.

The information acquired by the information acquisition mechanism in the valve V is collected in the flow rate control device F constituting the same fluid supply lines L1, L2, and L3.

The gas unit 1 is connected to a mechanism outside the line including a driving pressure supply source that supplies a driving pressure, an electric power supply source that supplies electric power, a communication device that performs communication, and the like.

The fluid control device constituting the gas unit 1 includes: a first connection means that directly connects the mechanism outside the line and a predetermined fluid control device; and a second connection means that connects the mechanism outside the line and another fluid control device by branching from the first connection means or via the fluid control device to which the first connection means connects. Specifically, in the case of the fluid supply line L1, with reference to FIG. 5 which will be described later in detail, for the supply of electric power from the outside of the line and the communication with the outside of the line, a main cable 10 and an extension cable constitute the first connection means, and sub cables 111, 112, 113, and 114 constitute the second connection means. In addition, with reference to FIG. 6 described later in detail, for the supply of a driving pressure from the outside of the line, a main tube 20, an extension tube 21, and a sub tube 214 constitute the first connection means, and extension tubes 211, 212, and 213 and sub tubes 215, 216, 217, and 218 constitute the second connection means.

Figure 6:
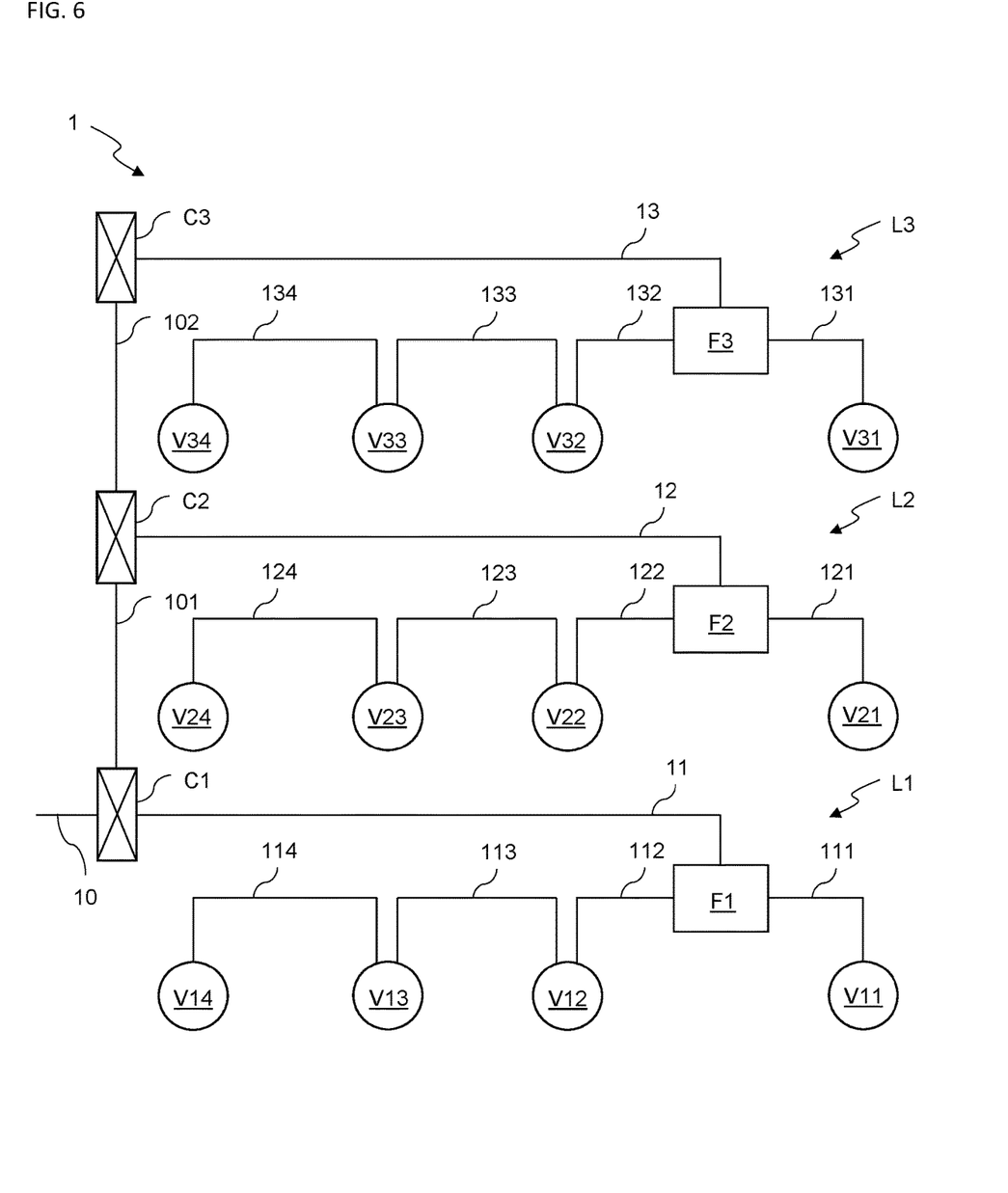
FIG. 6 is a schematic diagram showing a cable wiring structure in the gas unit constituted by the fluid supply line according to the present embodiment.

As shown in FIG. 6, the supply of electric power and the communication with the outside of the line are enabled by the main cable 10 that connects the mechanism outside the line and the gas unit 1.

The main cable 10 is branched into an extension cable 11 and a branch cable 101 by a branch connector C1 provided in the vicinity of the gas unit 1, and the branch cable 101 is branched into an extension cable 12 and a branch cable 102 by a branch connector C2, and the branch cable 102 is connected to an extension cable 13 via a branch connector C3.

Here, the position where the branch connector C1 is provided is in "the vicinity of the gas unit 1" in order to shorten the lengths of the branch cables 101 and 102 and the extension cables 11, 12, and 13 as much as possible. Therefore, "the vicinity of the gas unit 1" as the position where the branch connector C1 is provided refers to at least a position closer to flow rate control devices F1, F2, and F3 on a route that links the mechanism outside the line with the flow rate control devices F1, F2, and F3 to which the main cable 10 is connected through the extension cables 11, 12, 13. More preferably, "the vicinity of the gas unit 1" refers to the position where the branch connector C1 is provided when the extension cables 11, 12, and 13 and the branch cables 101 and 102 connected to the flow rate control devices F1, F2, and F3 are set to the minimum lengths necessary for connecting each device and the like.

As for the fluid supply lines L1, L2, and L3, the extension cable 11 is connected to the flow rate control device F1 in the fluid supply line L1. The sub cables 111 and 112 are led out from the flow rate control device F1 to which the extension cable 11 is connected, the sub cable 111 is connected to the valve V11, and the sub cable 112 is connected to the valve V12.

The sub cable 113 is led out from the valve V12 to which the sub cable 112 is connected, and the sub cable 113 is connected to the valve V13. The sub cable 114 is led out from the valve V13 to which the sub cable 113 is connected, and the sub cable 114 is connected to the valve V14.

The fluid supply line L2 is also connected to a mechanism outside the line by the same configuration as the fluid supply line L1.

Specifically, the extension cable 12 is connected to the flow rate control device F2. Sub cables 121 and 122 are led out from the flow rate control device F2 to which the extension cable 12 is connected. The sub cable 121 is connected to a valve V21, and the sub cable 122 is connected to a valve V22.

A sub cable 123 is led out from the valve V22 to which the sub cable 122 is connected, and a sub cable 123 is connected to a valve V23. A sub cable 124 is led out from the valve V23 to which the sub cable 123 is connected, and the sub cable 124 is connected to a valve V24.

The fluid supply line L3 is also connected to a mechanism outside the line by the same configuration as the fluid supply line L1.

Specifically, the extension cable 13 is connected to the flow rate control device F3. Sub cables 131 and 132 are led out from the flow rate control device F3 to which the extension cable 13 is connected. The sub cable 131 is connected to a valve V31, and the sub cable 132 is connected to a valve V32.

A sub cable 133 is led out from the valve V32 to which the sub cable 132 is connected, and a sub cable 133 is connected to a valve V33. A sub cable 134 is led out from the valve V33 to which the sub cable 133 is connected, and the sub cable 134 is connected to a valve V34.

As for the fluid supply line L1, the extension cable 11 is connected to the flow rate control device F1, and the sub cables 111 and 112 are led out from the flow rate control device F1, but the extension cable and 11 the sub cables 111 and 112 are connected together in the flow rate control device F1. The connection can be made via the arithmetic processing device provided in the flow rate control device F1 or by branching the extension cable 11.

In the valves V12 and V13 as well, the sub cable 112 is connected to the sub cable 113, and the sub cable 113 is connected to the sub cable 114. The connection of the sub cables 112, 113, and 114 can also be made via the arithmetic processing device provided in the valves V12 and V13 or by branching the sub cables 112 and 113.

In any of the connections, it is only necessary that the mechanism outside the line and the valves V11, V12, V13, and V14 are communicably connected via the flow rate control device F1 and are supplied with electric power.

The same applies to the connections in the other fluid supply lines L2 and L3, and the valves V21, V22, V23, and V24 are connected to a mechanism outside the line via the flow rate control device F2 by the main cable 10, the extension cable 12, and the sub cables 121, 122, 123, and 124. The valves V31, V32, V33, and V34 are connected to a mechanism outside the line via the flow rate control device F3 by the main cable 10, the extension cable 13, and the sub cables 131, 132, 133, and 134.

Figure 7:
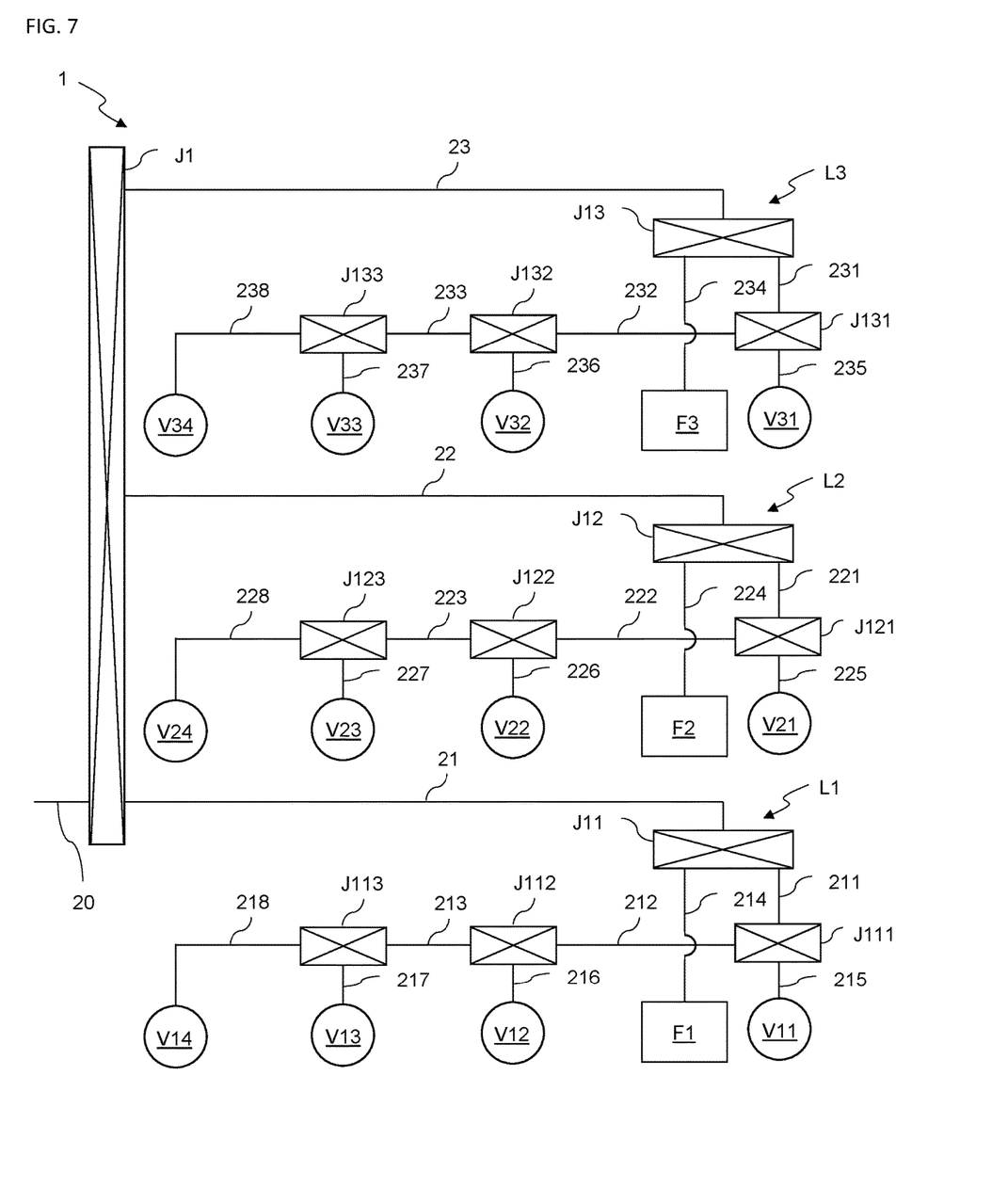
FIG. 7 is a schematic diagram showing a connection structure of a driving pressure supply path in the gas unit constituted by the fluid supply line according to the present embodiment.

As shown in FIG. 7, the driving pressure is supplied from a mechanism outside the line to the gas unit 1 through the main tube 20.

The main tube 20 branches into the extension tubes 21, 22, and 23 for supplying the driving pressure to each of the fluid supply lines L1, L2, and L3 by a branch joint J1 provided in the vicinity of the gas unit 1.

As for each of the fluid supply lines L1, L2, and L3, in the fluid supply line L1, the extension tube 21 is branched by a joint J11 into the extension tube 211 and the sub tube 214. The sub tube 214 is connected to the flow rate control device F1, thereby supplying the driving pressure to the flow rate control device F1.

The extension tube 211 is further branched by a joint J111 into the extension tube 212 and the sub tube 215. The sub tube 215 is connected to the valve V11, thereby supplying the driving pressure to the valve V11.

Similarly, the extension tube 212 is further branched by a joint J112 into the extension tube 213 and the sub tube 216. The sub tube 216 is connected to the valve V12, thereby supplying the driving pressure to the valve V12.

The extension tube 213 is further branched by a joint J113 into the sub tube 217 and the sub tube 218. The sub tube 217 is connected to the valve V13, thereby supplying the driving pressure to the valve V13. The sub tube 218 is connected to the valve V14, thereby supplying the driving pressure to the valve V14.

The driving pressure is also supplied to the fluid supply line L2 by the same configuration as that of the fluid supply line L1.

Specifically, the extension tube 22 is further branched by a joint J12 into the extension tube 221 and the sub tube 224. The sub tube 224 is connected to the flow rate control device F2, thereby supplying the driving pressure to the flow rate control device F2.

The extension tube 221 is further branched by a joint J121 into the extension tube 222 and the sub tube 225. The sub tube 225 is connected to the valve V21, thereby supplying the driving pressure to the valve V21.

Similarly, the extension tube 222 is further branched by a joint J122 into the extension tube 223 and the sub tube 226. The sub tube 226 is connected to the valve V22, thereby supplying the driving pressure to the valve V22.

The extension tube 223 is further branched by a joint J123 into the sub tube 227 and the sub tube 228. The sub tube 227 is connected to the valve V23, thereby supplying the driving pressure to the valve V23. The sub tube 228 is connected to the valve V24, thereby supplying the driving pressure to the valve V24.

The driving pressure is also supplied to the fluid supply line L3 by the same configuration as that of the fluid supply line L1.

Specifically, the extension tube 23 is further branched by a joint J13 into the extension tube 231 and the sub tube 234. The sub tube 234 is connected to the flow rate control device F3, thereby supplying the driving pressure to the flow rate control device F3.

The extension tube 231 is further branched by a joint J131 into the extension tube 232 and the sub tube 235. The sub tube 235 is connected to the valve V31, thereby supplying the driving pressure to the valve V31.

Similarly, the extension tube 232 is further branched by a joint J132 into the extension tube 233 and the sub tube 236. The sub tube 236 is connected to the valve V32, thereby supplying the driving pressure to the valve V32.

The extension tube 233 is further branched by a joint J133 into the sub tube 237 and the sub tube 238. The sub tube 237 is connected to the valve V33, thereby supplying the driving pressure to the valve V33. The sub tube 238 is connected to the valve V34, thereby supplying the driving pressure to the valve V34.

Figure 8:
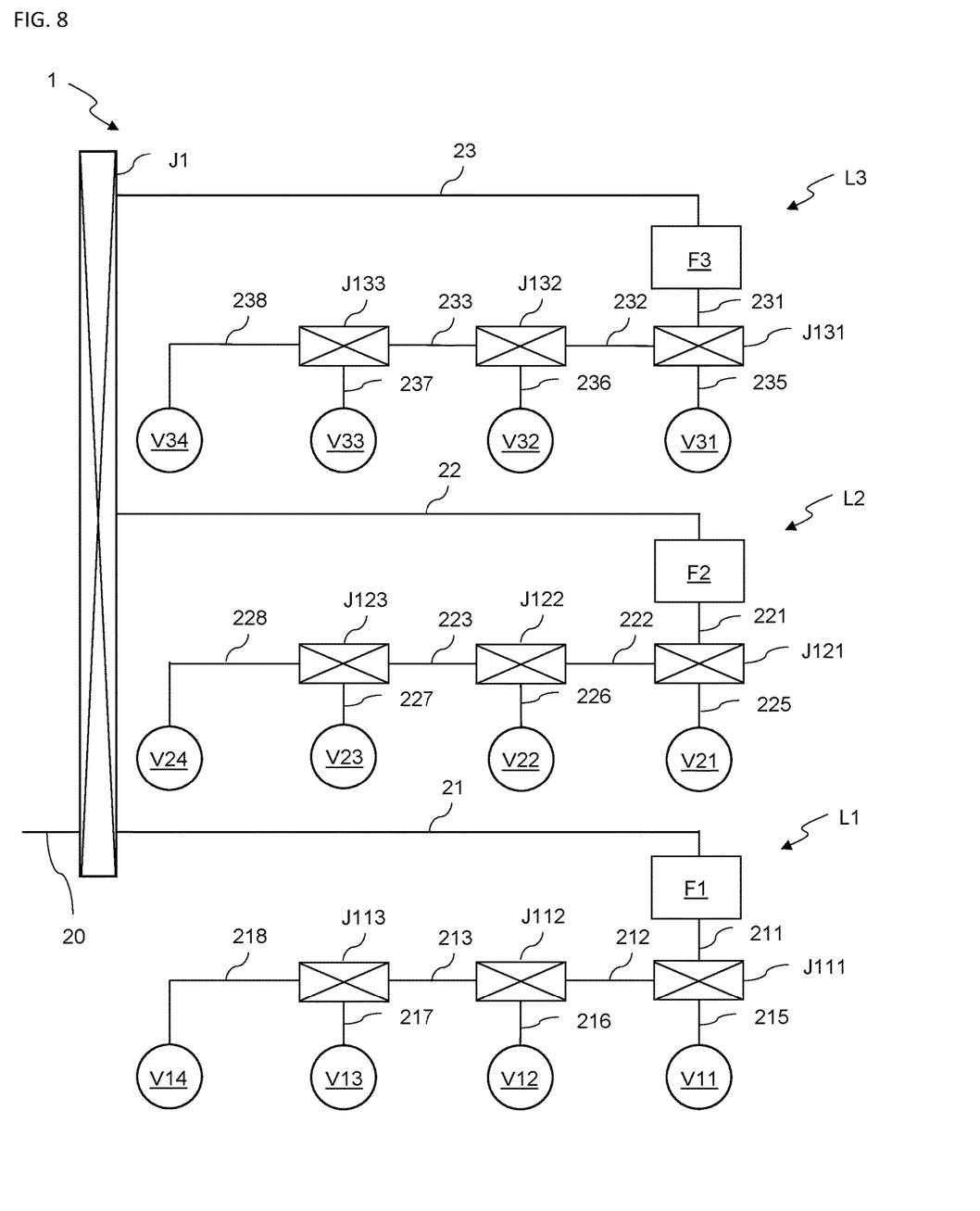
FIG. 8 is a schematic diagram showing a connection structure of a driving pressure supply path in a gas unit constituted by a fluid supply line according to a modification example of the present embodiment.

As for the fluid supply line L1, the flow rate control device F1 and the valves V11, V12, V13, and V14 are all connected to the extension tube 21 and the main tube 20 beyond via the joints J11, J111, J112, and J113, the extension tubes 211, 212, and 213, and the sub tubes 214, 215, 216, 217, and 218. However, the fluid supply line L1 is not limited to this configuration but may be configured as illustrated in FIG. 8 such that the extension tube 21 and the flow rate control device F1 are connected and the driving pressure is supplied from the flow rate control device F1 to the valves V11, V12, V13, and V14. In this case, the flow rate control device F1 may be provided with a mechanism for distributing the driving pressure supplied from the main tube 20 to the valves V11, V12, V13, and V14, or the main tube drawn into the flow rate control device F1 may be branched in the flow rate control device F1.

The same can be applied to the fluid supply lines L2 and L3.

According to this configuration of the fluid supply lines L1, L2, and L3, it is possible to simplify cables for power supply and communication, thereby to reduce noise and suppress a delay in the transmission rate of instruction signals. In addition, since the inner volume of the tube supplying the driving pressure can be reduced, it is possible to maintain the opening and closing speed of each fluid control device such as the valve V and the flow rate control device F, and prevent the occurrence of an error in the opening and closing speed of each fluid control device. As a result, it is also possible to improve the control accuracy of the fluid supply lines L1, L2, and L3 by suppressing variations in operations of the fluid control devices.

In this case, each valve V is communicably connected to the flow rate control device F. When the flow rate control device F identifies each valve V to be made controllable, it is possible to individually identify the valves V constituting the same line to diagnose the presence or absence of an abnormality, or analyze the operations of the valves V viewed from the entire line.

The flow rate control devices F1, F2, and F3 can transmit the collected operation information of the fluid supply lines L1, L2, and L3 to an external information processing device via the main cable 10 so that the information processing device can diagnose the presence or absence of an abnormality and analyze the operations. Note that the external information processing device may constitute a part of the mechanism outside the line, or may be a device communicably connected to the mechanism outside the line. The external information processing device can be configured by a server computer or the like.

Figure 9:
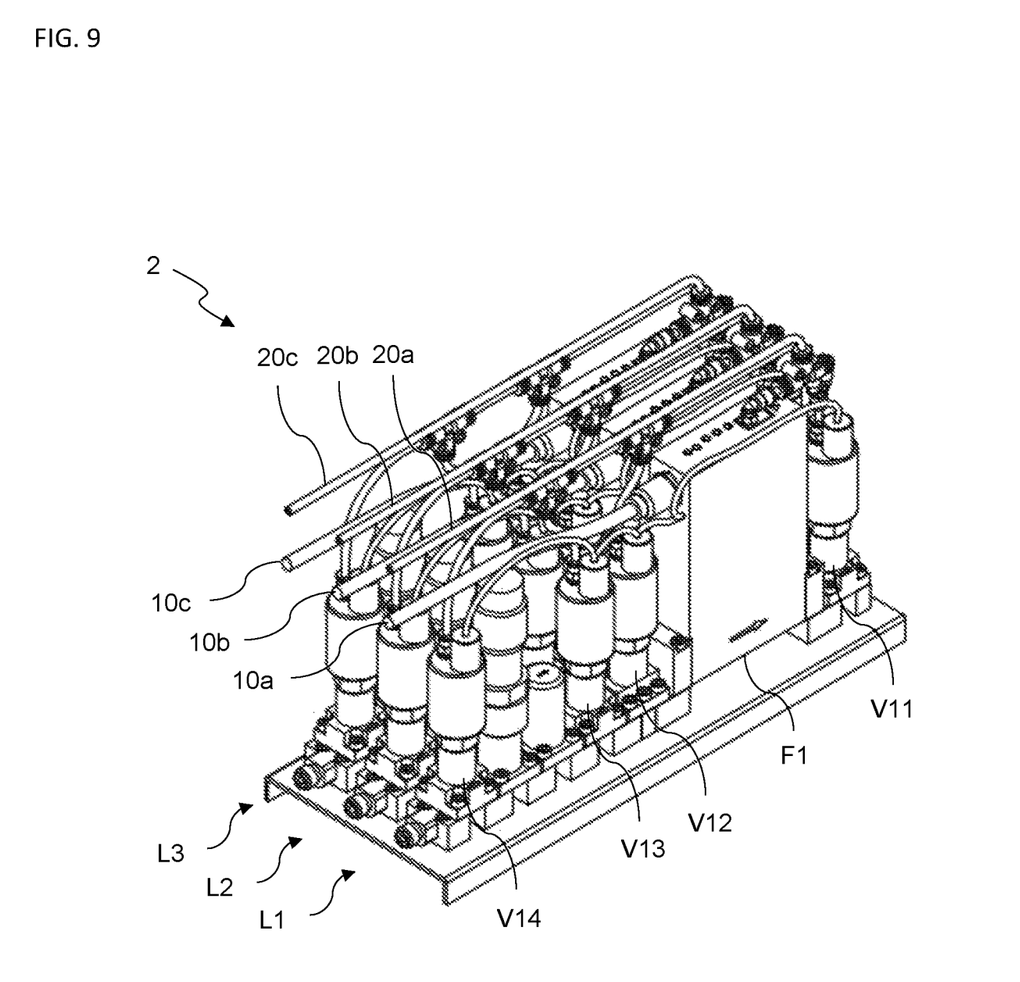
FIG. 9 is an external perspective view of a gas unit constituted by a fluid supply line according to another embodiment of the present invention.
Figure 10:
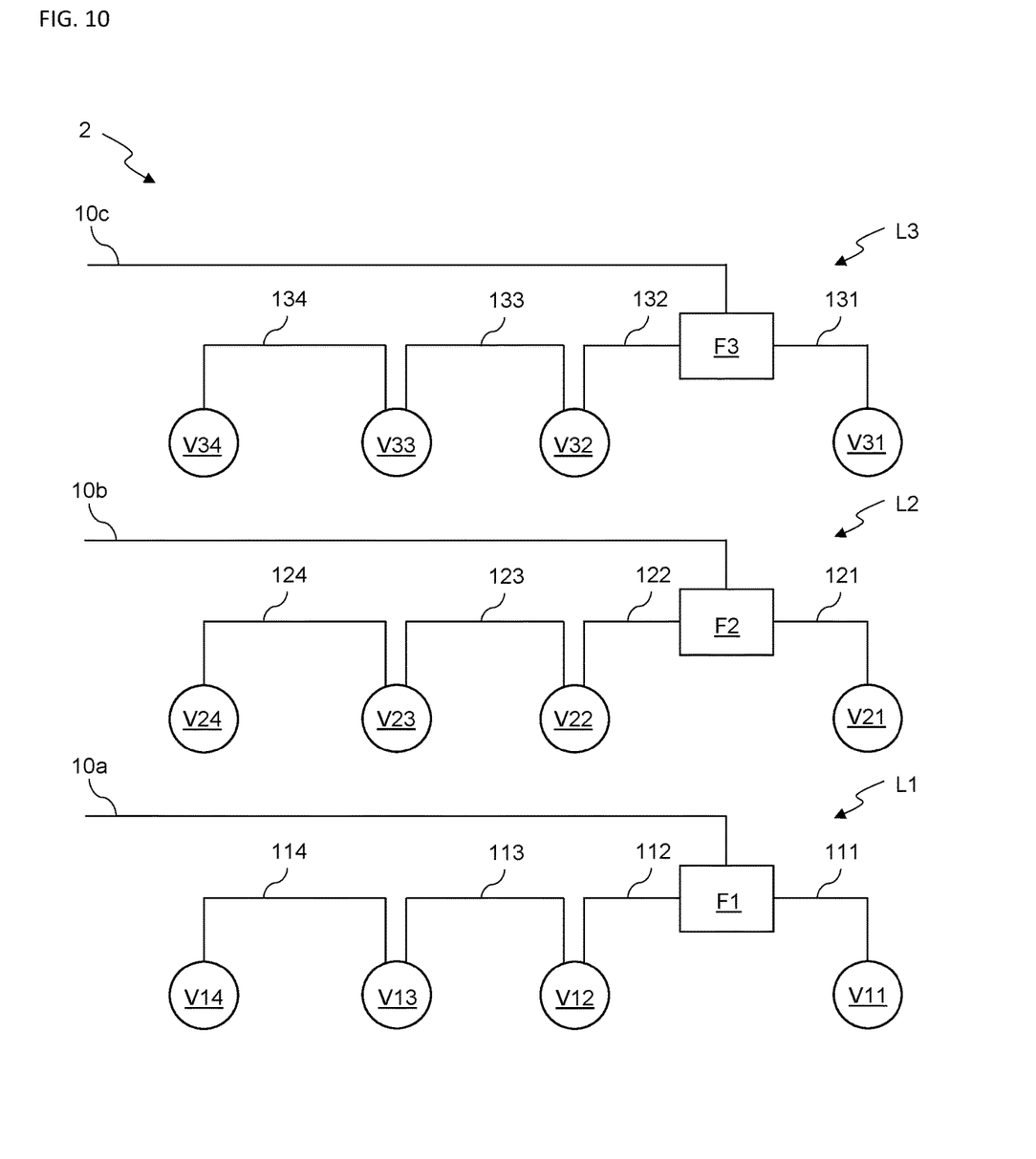
FIG. 10 is a schematic diagram showing a cable wiring structure in the gas unit constituted by the fluid supply line according to the other embodiment of the present invention.
Figure 11:
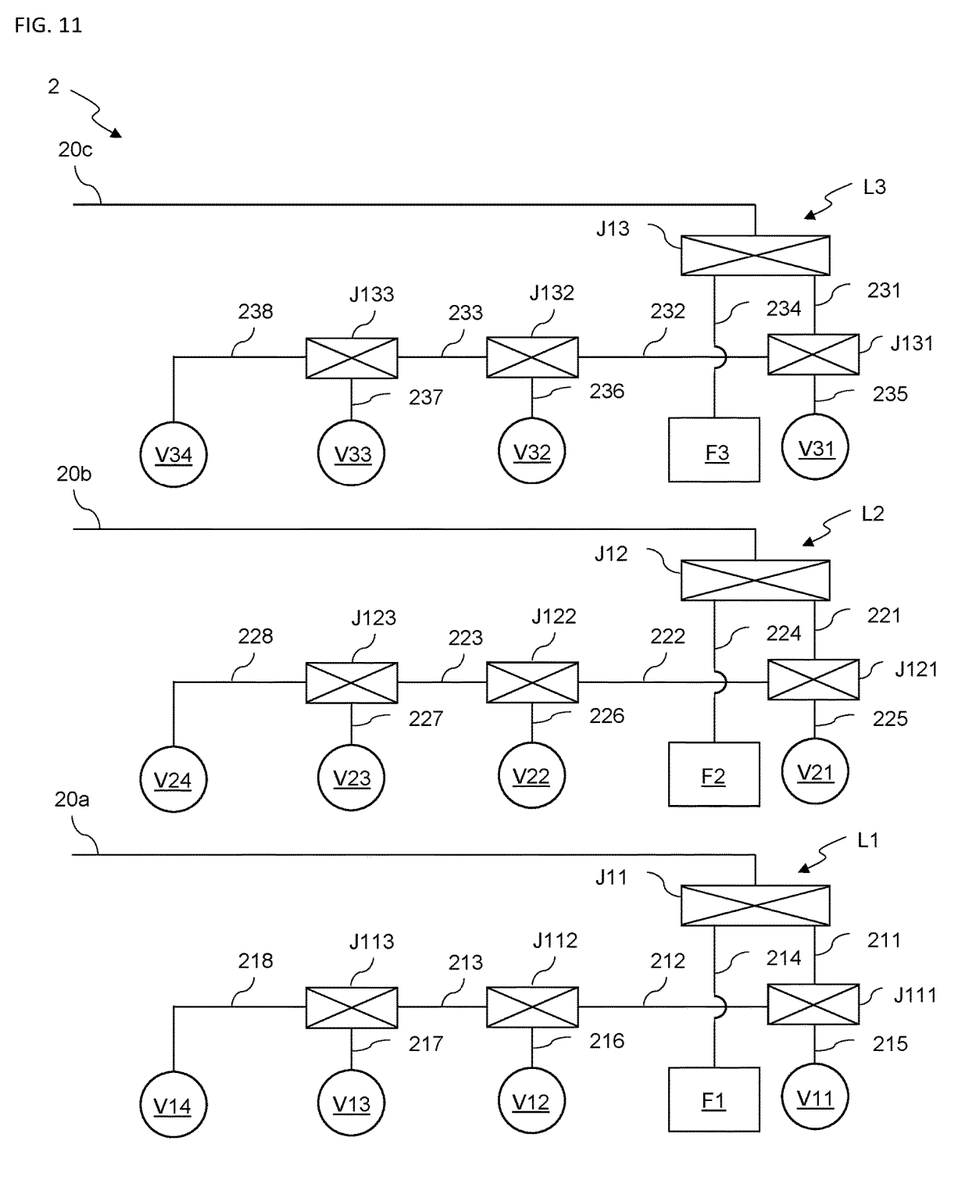
FIG. 11 is a schematic diagram showing a connection structure of a driving pressure supply path in the gas unit constituted by the fluid supply line according to the other embodiment of the present invention.

The fluid supply lines L1, L2, and L3 described above can also constitute a gas unit 2 shown in FIGS. 9 to 11.

Unlike the gas unit 1, the fluid supply lines L1, L2, and L3 constituting the gas unit 2 are separately connected to mechanisms outside the line.

That is, as shown in FIG. 10, the gas unit 2, the supply of power, and communication with the outside of the line are allowed by a main cable 10a connecting the mechanism outside the line and the fluid supply line L1, a main cable 10b connecting the mechanism outside the line and the fluid supply line L2, and a main cable 10c connecting the mechanism outside the line and the fluid supply line L3.

In each of the fluid supply lines L1, L2, and L3, the connection from the flow rate control devices F to the valves V is the same as that of the gas unit 1.

As shown in FIG. 11, the driving pressure is supplied from the mechanism outside the line to the gas unit 2 through the main tubes 20a, 20b, and 20c respectively for the fluid supply lines L1, L2, and L3.

In each of the fluid supply lines L1, L2, and L3, connections from the joints J11, J12, and J13 to the flow rate control devices F and the valves V are the same as those of the gas unit 1.

In the present embodiment, each of the gas units 1 and 2 is configured by the three fluid supply lines L1, L2, and L3. However, the application of the present invention is not limited by the number of lines.

In addition, embodiments of the present invention are not limited to the above-described embodiments, and those skilled in the art will be able to change and add various configurations, means, or functions without departing from the scope of the present invention.

REFERENCE SIGNS LIST 1, 2 Gas unit
10, 10a, 10b, 10c Main cable
101, 102 Branch cable
11, 12, 13 Extension cable
111, 112, 113, 114 Sub cable
121, 122, 123, 124 Sub cable
131, 132, 133, 134 Sub cable
20, 20a, 20b, 20c Main tube
21, 22, 23 Extension tube
211, 212, 213 Extension tube
214, 215, 216, 217, 218 Sub tube
221, 222, 223 Extension tube
224, 225, 226, 227, 228 Sub tube
231, 232, 233 Extension tube
234, 235, 236, 327, 238 Sub tube
3 Valve body
3a Driving pressure introduction port
Driving pressure control device
40 Casing
411, 412 Automatic valve
421, 422 Valve drive unit 431, 432, 433 Driving pressure introduction path
44 Exhaust passage
45 Wiring
L1, L2, L3 Fluid supply line
C1, C2, C3 Branch connector
F (F1, F2, F3) Flow rate control device
J1 Branch joint
J11, J111, J112, J113 Joint
J12, J121, J122, J123 Joint
J13, J131, J132, J133 Joint
V (V11 to V14, V21 to 24, V31 to 34) Valve

The invention claimed is:

1. A fluid supply line comprising:
a flow rate control device;
a valve body; and
a driving pressure control device that is coupled to the valve body, wherein
the driving pressure control device includes:
a first driving pressure introduction path connected to a driving pressure supply source outside a line;
a first automatic valve that opens and closes the first driving pressure introduction path;
a second driving pressure introduction path that couples to a driving pressure introduction port of the valve body;
a second automatic valve that opens and closes the second driving pressure introduction path in conjunction with the first automatic valve and opens and closes an exhaust passage that discharges a driving pressure from the second driving pressure introduction path; and
a third driving pressure introduction path that couples the first driving pressure introduction path and the second driving pressure introduction path via the first automatic valve and the second automatic valve; and
wherein the fluid supply line further has:
a first connection means that connects a mechanism outside the fluid supply line and the flow rate control device; and
a second connection means that branches from the first connection means in the fluid supply line and is connected to the valve.

2. The fluid supply line according to claim 1, wherein the first connection means and the second connection means are driving pressure supply paths for supplying a driving pressure used for driving the valve from the mechanism outside the fluid supply line.

3. The fluid supply line according to claim 1, wherein the first connection means and the second connection means are electrical wiring that enable communication between the mechanism outside the fluid supply line, the flow rate control device, and the valve.

4. The fluid supply line according to claim 1, wherein a plurality of the fluid supply lines is arranged in parallel to form a gas unit, and the first connection means branches in the vicinity of the gas unit for each of the plurality of fluid supply lines and is connected to each of flow rate control devices on the plurality of fluid supply lines.

5. The fluid supply line according to claim 1, wherein the flow rate control device is a flow rate range variable-type flow rate control device,
the flow rate range variable-type flow rate control device is provided with at least a fluid passage for small flow rate and a fluid passage for large flow rate as fluid passages to a flow rate detection unit of a flow rate control device, and
the flow rate range variable-type flow rate control device flows a fluid in a small flow rate range to the flow rate detection unit through the fluid passage for small flow rate and switches a detection level of the flow rate control unit to a detection level suited for detection of the small flow rate range according to presence or absence of supply of a driving pressure, and flows a fluid in a large flow rate range to the flow rate detection unit through the fluid passage for large flow rate and switches the detection level of the flow rate control unit to a detection level suited to detection of the flow rate in the large flow rate range according to presence or absence of supply of the driving pressure, thereby to perform a flow rate control while switching between the fluid in the large flow rate range and the fluid in the small flow rate range.

6. The fluid supply line according to claim 5, wherein the driving pressure supplied to the flow rate range variable-type flow rate control device is supplied to another fluid control device through the flow rate range variable-type flow rate control device.

7. The fluid supply line according to claim 1, wherein the flow rate control device is a differential pressure-type flow rate control device, and
the differential pressure-type flow rate control device includes:
a control valve unit that includes a valve drive unit;
an orifice that is provided downstream of the control valve;
a detector of a fluid pressure upstream of the orifice;
a detector of a fluid pressure downstream of the orifice;
a detector of a fluid temperature upstream of the orifice; and
a control arithmetic circuit that includes a flow rate comparison circuit configured to calculate a fluid flow rate using detected pressures and a detected temperature from the detectors and calculate a difference between the calculated flow rates and a preset flow rate.

* * * * *